US008255658B2

(12) United States Patent
Adachi et al.

(10) Patent No.: US 8,255,658 B2
(45) Date of Patent: Aug. 28, 2012

(54) MEMORY MANAGEMENT METHOD AND COMPUTER USING THE SAME

(75) Inventors: Masahiko Adachi, Yokohama (JP); Hiroyasu Nishiyama, Kawasaki (JP); Motoki Obata, Toda (JP); Kei Nakajima, Chigasaki (JP); Koichi Okada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 445 days.

(21) Appl. No.: 12/486,919

(22) Filed: Jun. 18, 2009

(65) Prior Publication Data

US 2010/0077170 A1  Mar. 25, 2010

(30) Foreign Application Priority Data

Sep. 22, 2008  (JP) ................................. 2008-242745

(51) Int. Cl.
 G06F 12/00 (2006.01)
 G06F 13/00 (2006.01)
 G06F 13/28 (2006.01)
(52) U.S. Cl. ......... 711/165; 711/100; 711/154; 711/170
(58) Field of Classification Search .......................... None
See application file for complete search history.

(56) References Cited

U.S. PATENT DOCUMENTS

| | | | |
|---|---|---|---|
| 7,484,067 B1 * | 1/2009 | Bollella et al. | 711/170 |
| 7,979,659 B2 * | 7/2011 | Obata et al. | 711/165 |
| 2005/0071597 A1 * | 3/2005 | Lee | 711/170 |
| 2009/0083509 A1 * | 3/2009 | Johnson | 711/170 |
| 2011/0213943 A1 * | 9/2011 | Obata et al. | 711/165 |

OTHER PUBLICATIONS

A. Corsaro et al., Efficient Memory-Reference Checks for Real-time Java, Proceedings of the 2003 Conference on Languages, Compilers, and Tools for Embedded Systems, 2003, pp. 51-58.
F. Pizlo et al., Real-Time Java Scoped Memory: Design Patterns and Semantics, Proceedings of the Seventh IEEE Internal Symposium on Object-Oriented Real-Time Distributed Computing, 2004.

* cited by examiner

*Primary Examiner* — Yaima Campos
*Assistant Examiner* — Daniel Tsui
(74) *Attorney, Agent, or Firm* — Mattingly & Malur, PC

(57) ABSTRACT

The present invention provides a memory management method, including the steps of: securing a memory area by a program executed by a computer; storing an object in the memory area in accordance with the execution of the program; bringing the memory area into a release reservation state in accordance with the program instructing the memory area to be released; moving the object to a memory area not to be released while another object in the memory area not to be released and not to be brought into the release reservation state refers to the object in the memory area to be released including the memory area to be brought into the release reservation state; and releasing the memory area to be released.

6 Claims, 13 Drawing Sheets

1: //EXTERNAL HEAP MEMORY GENERATION

2: //ExplicitMemory em = new ExplicitMemory(); ~201

3: //OBJECTS GENERATED IN FROM enter TO exit
   //ARE GENERATED IN EXTERNAL HEAP MEMORY 4: em.enter();
5: {any operation;}
6: em.exit();
~202

7: {any operation;}

8: //EXTERNAL MEMORY AREA IS RELEASED

9: //ExplicitMemory.reclaim(em); ~203

| EXTERNAL HEAP MEMORY ID | HEAP SIZE |
|---|---|
| EH1 | Eh1(Kbytes) |
| EH2 | Eh2(Kbytes) |
| EH3 | Eh3(Kbytes) |
| . | . |
| EHm | Ehm(Kbytes) |
| – | – |
| – | – |
| – | – |

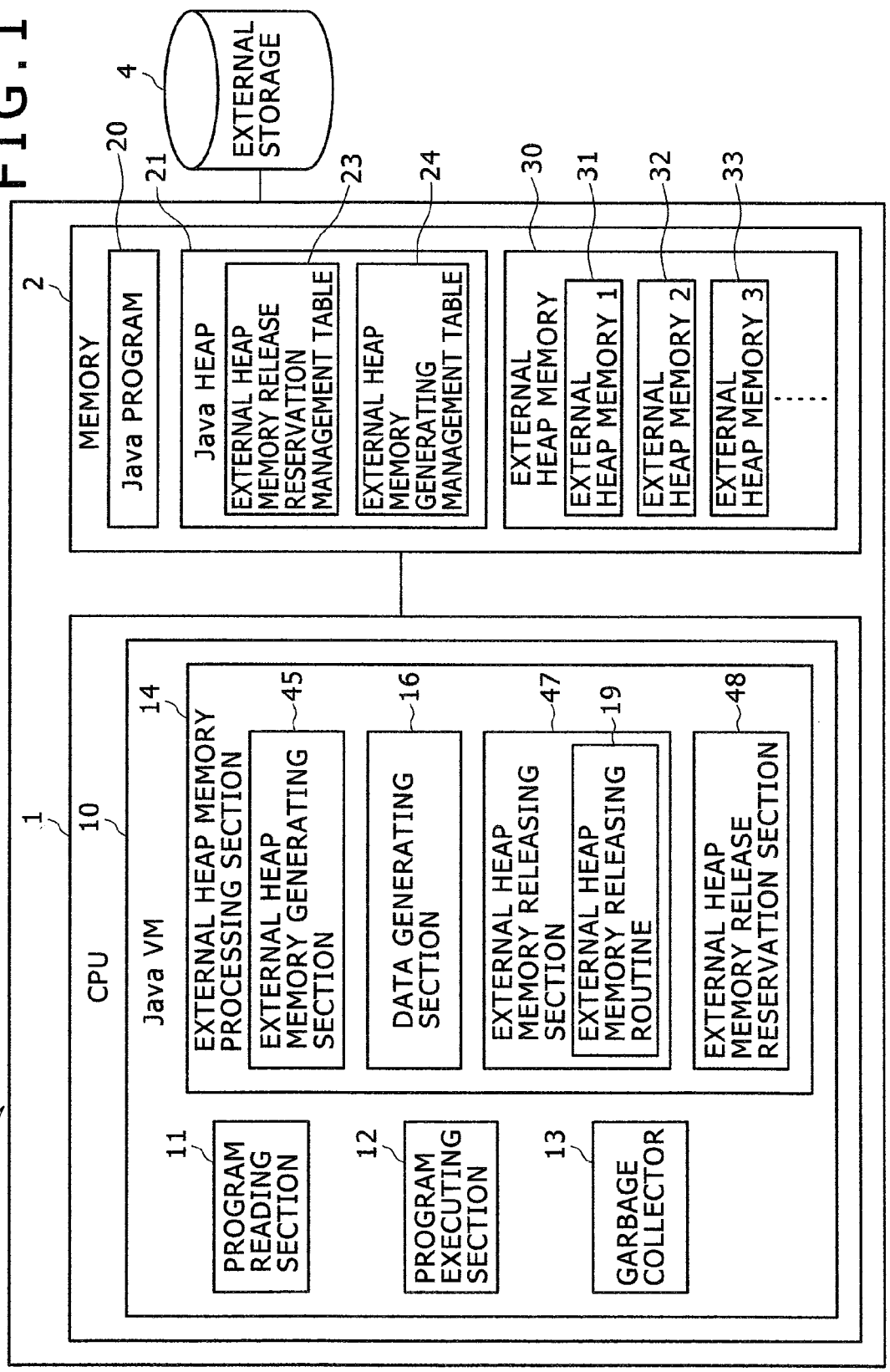

| EXTERNAL HEAP MEMORY ID | GROUP ID |
|---|---|
| EH1 | G1 |
| EH2 | G1 |
| EH3 | G2 |
| . | . |
| EHm | Gq |
| — | — |
| — | — |
| — | — |

| GROUP ID | THE NUMBER OF GENERATED EXTERNAL HEAP MEMORY MEMORIES |
|---|---|
| G1 | 12 |
| G2 | 6 |
| . | . |
| Gp | 29 |
| — | — |

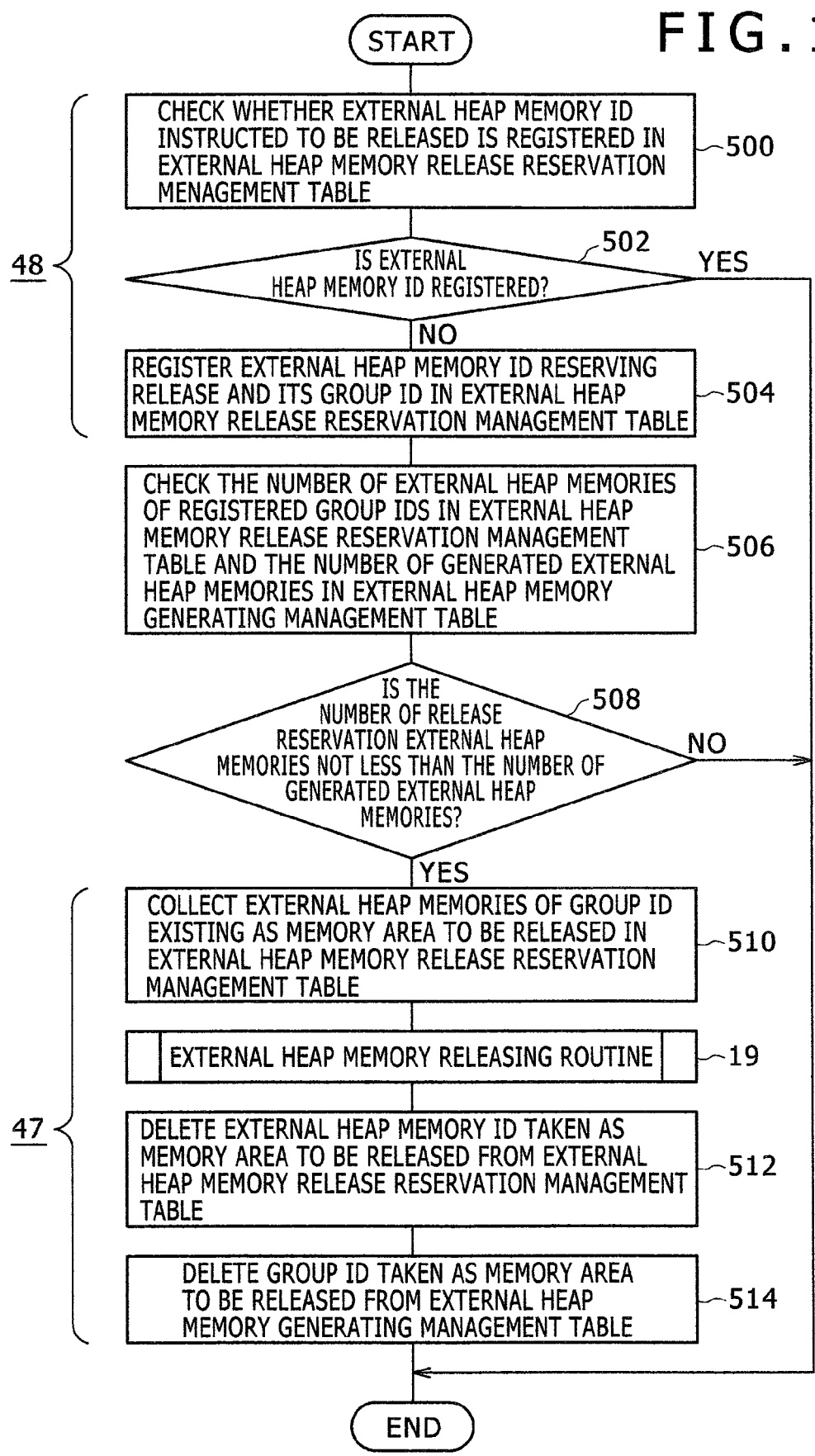

MEMORY MANAGEMENT METHOD AND COMPUTER USING THE SAME

INCORPORATION BY REFERENCE

This application claims priority based on a Japanese patent application, No. 2008-242745 filed on Sep. 22, 2008, the entire contents of which are incorporated herein by reference.

BACKGROUND OF THE INVENTION

The present invention relates to a memory management method which dynamically secures and releases a memory of a computer, and a computer using the same.

It has been known that securing and releasing processing of a memory area used by a program when a computer program is developed is apt to cause a problem with a program such as a false area reference. Particularly, in a program development by plural persons or large-scale program development, it is becoming difficult to completely grasp securing and releasing processing of all memories.

To solve this problem, there is used a garbage collector for automating memory management in a program. Java (a registered trademark of Sun Microsystems, Inc. in the USA), which is one of language processors equipped with a memory management function using a garbage collector, prepares for an Application Program Interface (API, description for programming) but has no API for release. That is to say, a Java program developer needs to specify (describe) the securement of a memory area but does not need to describe the release processing of the memory area. The memory area secured in the process of executing a program is released by the garbage collector implemented in a Java virtual machine executing a program and the released area is reusable. A function executed by the garbage collector is garbage collection (hereinafter referred to as GC). In other words, the term GC refers to a function to collect (delete) unnecessary data out of the memory area dynamically secured by a program (during execution) and release the area where the unnecessary data is collected.

In a commonly used GC method, all Java program execution threads are stopped to collect unnecessary data. The Java virtual machine starts the garbage collector when the amount of use of a Java heap memory (hereinafter referred to as Java heap) which stores data (object) generated by a program exceeds a certain threshold.

In recent years, a Java system executing a program described by the Java language on a Java virtual machine has been used in an embedded system such as a server system, a cellular phone and a car navigation system. These systems have a problem in that the stoppage of the Java program execution thread by the GC lowers the response performance of the system.

A method of solving this problem is disclosed in Angelo Corsaro and Ron K. Cytron, Efficient Memory-Reference Checks for Real-time Java, Proceedings of the 2003 Conference on Languages, Compilers, and Tools for Embedded Systems, 2003 as well as in F. Pizlo, J. M. Fox, D. Holmes and J. Vitek, Real-Time Java Scoped Memory: Design Patterns and Semantics, Proceedings of the Seventh IEEE Internal Symposium on Object-Oriented Real-Time Distributed Computing, 2004. The methods disclosed in these documents have not only a heap memory (Java heap) subjected to the GC by the Java virtual machine, but also a heap memory (hereinafter referred to as external heap memory) not subjected to the GC. The term external heap memory refers to a memory area where a memory can be managed by a program. In other words, the securement of a memory area from the external heap memory, the generation of an object and the release of the memory area follow the description of a program into a source code by a programmer. In the release processing of memory area of the external heap memory, a referential relationship of an object generated in the secured memory area is restricted to release the memory area irrespective of an object generated in the memory area. The restriction ensures that, when an object generating thread is reduced to zero in a certain memory area in the external heap memory, the release of the memory area does not influence the execution of the program. Thus, the referential relationship of the object is restricted using an area where a memory area can be managed by a program, i.e., using the external heap memory not subjected to the GC by the Java virtual machine to minimize the occurrence of halt of the Java program execution thread for a long time.

The restrictive items on the referential relationship between the objects in the methods disclosed in the Angelo Corsaro and Ron K. Cytron as well as in the F. Pizlo, J. M. Fox, D. Holmes and J. Vitek significantly impair the convenience of this memory area. Specifically, one or more threads need to execute an interval generating an object on a memory area as a condition for the existence of the memory area of the external heap memory secured during the execution of the program; however, the condition imposes tight restrictions on the programming. Since the referential relationship between objects is restricted, the programmer needs to perform programming while always paying attention to the restriction; however, it is extremely difficult to grasp the referential relationship between objects because the program becomes large in scale and implicit data which is not described in a user program is generated. If the referential relationship against the restrictions is detected by a check at the time of executing the program, an exception occurs, which may not normally execute the program.

To solve such a problem, when a certain memory area in the external heap memory is released without imposing restrictions on the referential relationship between objects, a relationship between an object in the memory area to be released and an object in the other areas (the Java heap subjected to the GC and the memory area not subjected to the release of the external heap memory) is checked to confirm that the release of the memory area does not disturb the execution of the program, and then the memory area is released.

The check of the referential relationship between objects requires processing time depending on the number of objects included in the Java heap and the external heap memory. In general, the larger the capacity of the Java heap and the external heap memory, the greater the number of objects included therein, so that a system with a large capacity memory requires a long processing time to safely release a memory.

SUMMARY OF THE INVENTION

The present invention provides below a memory management method and a computer using the same. The memory management method includes the steps of: securing a memory area by a program executed by a computer; storing an object in the memory area in accordance with the execution of the program; bringing the memory area into a release reservation state in accordance with the program instructing the memory area to be released; moving the object to a memory area not to be released while another object in the memory area not to be released and not to be brought into the release reservation state refers to the object in the memory area to be released including the memory area to be brought into the release reservation state; and releasing the memory area to be released.

Another desirable aspect of the present invention is that the move of an object to a memory area not to be released and the release of the memory area to be released are executed at a predetermined moment.

According to the present invention, it is enabled to shorten the processing time required for releasing the memory area dynamically secured.

BRIEF DESCRIPTION OF THE DRAWINGS

FIG. 2 is a chart illustrating an example of description of a Java program;

FIG. 11 is a block diagram illustrating a configuration of a computer according to the second embodiment;

FIG. 12 is a table illustrating an example of an external heap memory release reservation management table;

FIG. 13 is a table illustrating an example of an external heap memory generating management table;

FIG. 15 is a process flow chart illustrating an example of an external heap memory release timing determination routine.

DETAILED DESCRIPTION OF THE PREFERRED EMBODIMENTS

The best embodiments for carrying out the present invention are described below as first and second embodiments.
First Embodiment The present embodiment is a method of releasing a memory and a computer using the same. In the present embodiment, although a Java system is described as an object, if there is a system which can determine whether data (object) stored in a memory to be released is required or not at the time of releasing the memory, such a memory may be taken as an object for description.

Figure 1:
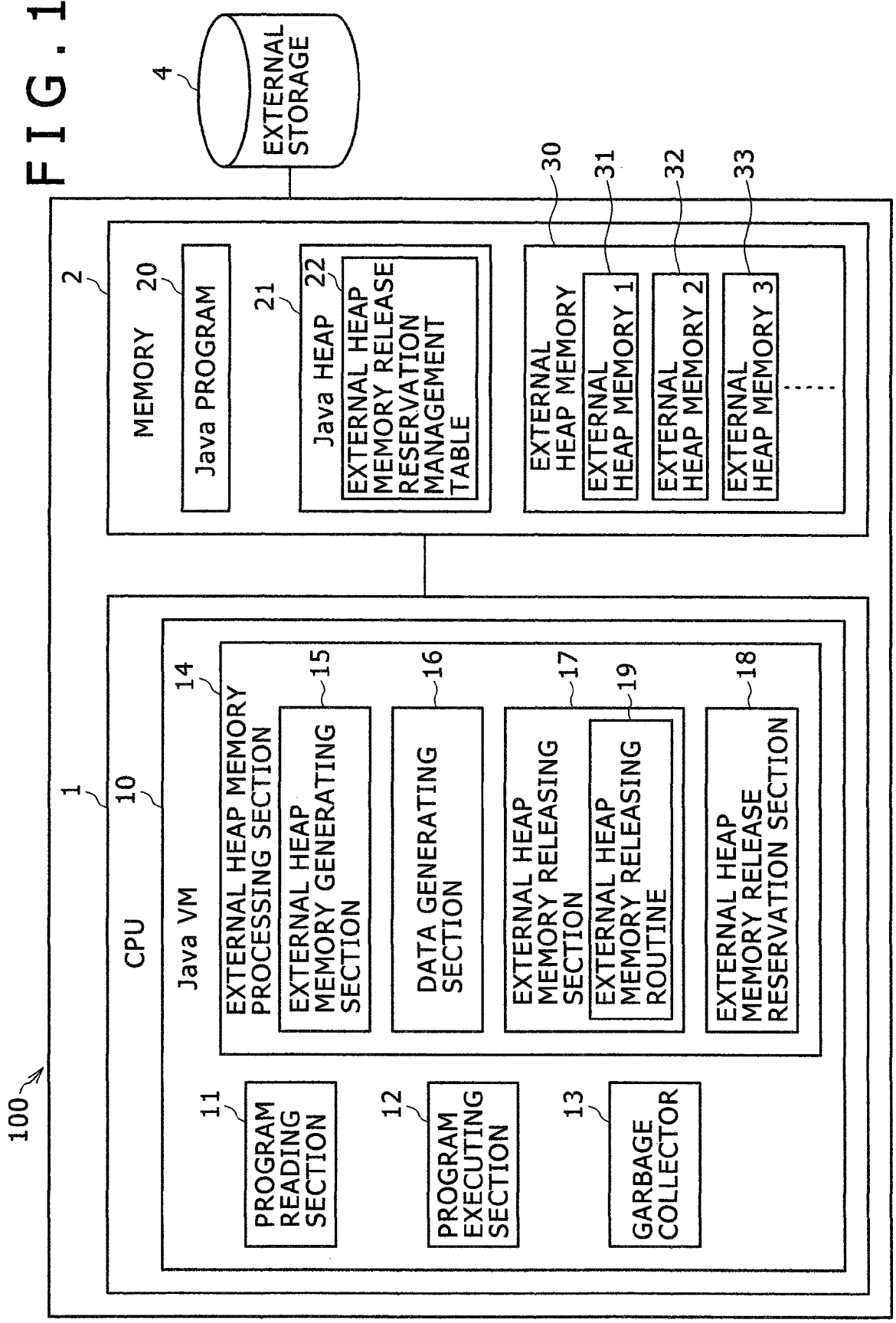
FIG. 1 is a block diagram illustrating a configuration of a computer according to the first embodiment.

FIG. 1 is a block diagram illustrating a configuration of a computer 100 according to the present embodiment. The computer 100 includes a processor (CPU) 1 for executing each processing, a memory 2 and an external storage 4. For the sake of easy understanding, FIG. 1 shows that a Java virtual machine (Java VM) 10 is mounted on the processor 1 and executed by the processor 1. If the Java virtual machine (Java VM) 10 is constructed by software, the software is stored in the external storage 4 and loaded on the memory 2 along with the start of the computer 100. The loaded software is executed by the processor 1 to construct the Java virtual machine 10 as a Java virtual machine.

The Java virtual machine 10 causes a program reading section 11 to read a Java program 20 and a program executing section 12 to execute the read Java program 20. The program executing section 12 is an interpreter or a Just-In-Time (JIT) compiler.

The memory 2 includes the Java program 20 executed by the Java virtual machine 10, a Java heap 21 (hereinafter referred to as Java heap) used by the Java virtual machine 10 and an external heap memory 30 (hereinafter referred to as external heap memory). The Java heap 21 is a memory subjected to garbage collection (GC) by the Java virtual machine 10 and a garbage collector 13 implemented in the Java virtual machine 10 performs memory management such as the GC. However, the memory area which the Java program 20 secures on the Java heap 21 cannot be released by the Java program 20.

The external heap memory 30 is a memory which is not garbage collected by the garbage collector 13 of the Java virtual machine 10 and a memory area is formed in the external heap memory 30 according to the execution of external heap memory generating statement described in the Java program 20. To form the memory area is actually to secure the memory area; however, it is viewed from the Java program 20 as if a usable memory area were formed, so that it is referred to as formation herein. In FIG. 1, the memory area to be formed is denoted by an external heap memory "i," specifically, an external heap memory 1 (31), an external heap memory 2 (32), an external heap memory 3 (33) .... The Java program 20 may be stored not on the memory 2 but in the external storage 4.

The Java program 20 describes the generation of an external heap memory, the generation of an object on the external heap memory and the release of the external heap memory in order not only for required processing as an application program but for the execution of its processing. The Java virtual machine 10 executing the program generates, uses and releases the external heap memory "i." An external heap memory processing section 14 is mounted on the Java virtual machine 10 to generate, use and release the external heap memory "i." The external heap memory processing section 14 includes an external heap memory generating section 15, a data generating section 16 to the external heap memory, an external heap memory releasing section 17 and an external heap memory release reservation section 18.

FIG. 2 illustrates an example of description of the Java program 20 including the description for the generation of the external heap memory "i" ("em" in the description in FIG. 2), the generation of data into the external heap memory "i" and the release of the external heap memory "i." A statement 201 on the second line is a description for generating the external heap memory "i" (the forgoing external heap memory generating statement). Data (object) generated in a process 202 from an enter method on the fourth line to an exit method on the sixth line (the process 202 is referred to as "data generation interval") is generated on the external heap memory "i." A statement 203 on the ninth line is a descriptive reclaim method for releasing the external heap memory "i." The execution of the reclaim method reclaims (deletes) the data generated inside and releases the external heap memory "i."

Simply releasing the external heap memory "i" subjected to a memory-area release by the reclaim method makes reference from another object false (or nonexistence of objects in a reference destination) if there exists another object referring to the data (object) included therein, causing a problem.

The external heap memory releasing section 17 checks if another object which refers to an object included in the external heap memory "i" and is included in the memory area (Java heap or other external heap memories) which is not released before the external heap memory releasing section 17 releases the external heap memory "i" to be released. If there is such a reference, the object to which another object refers (referred to as target object) is moved to the memory area not to be released to correct the referential relationship between the objects, enabling continuing the execution of the Java program 20 even after the external heap memory "i" is released.

Figure 3:
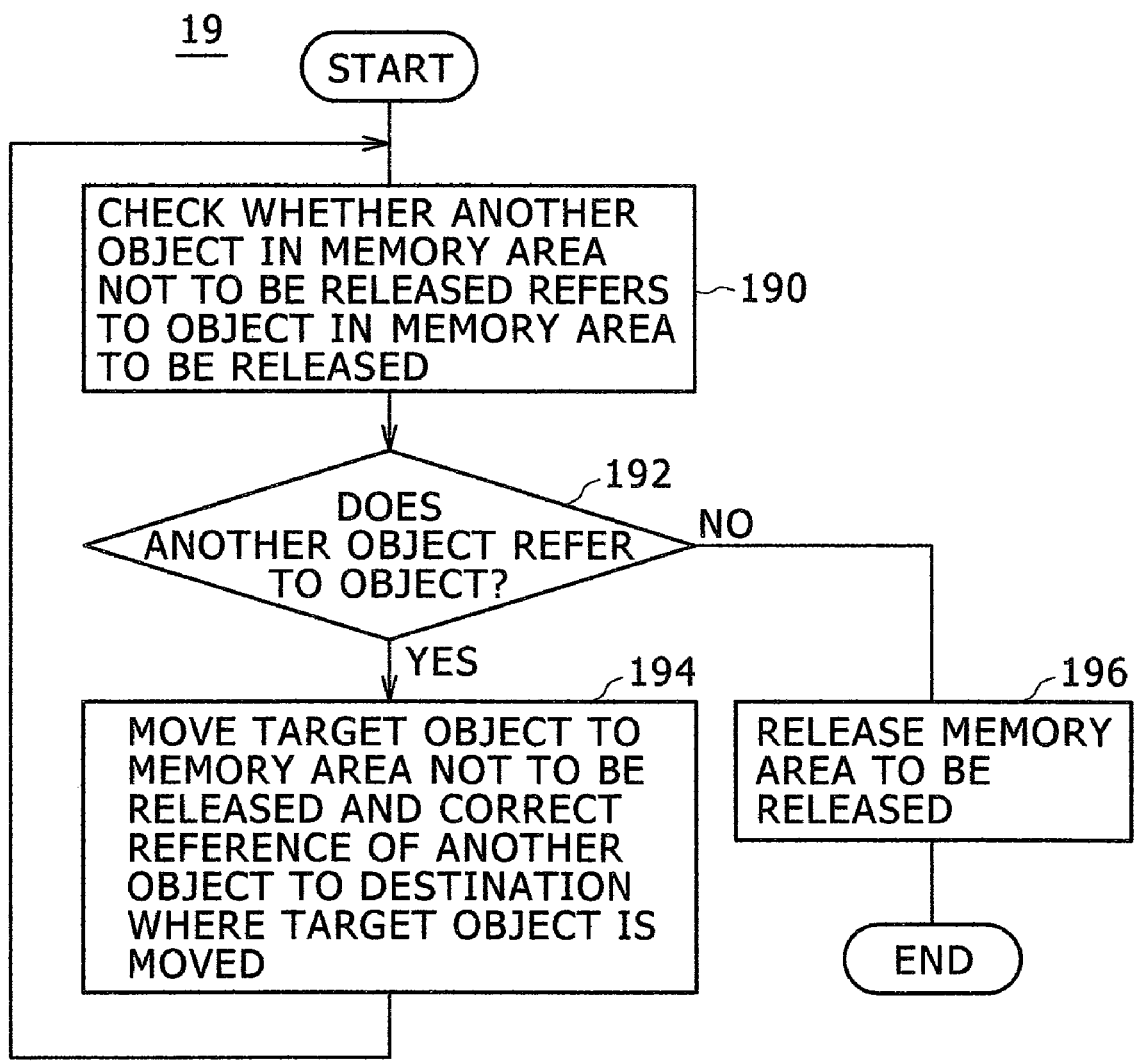
FIG. 3 is a process flow chart for an external heap memory releasing routine.

FIG. 3 is a process flow chart for an external heap memory releasing routine 19 adapted to continue a normal execution of the Java program 20 even after the external heap memory is released. If the process of the external heap memory release reservation section 18 described later is not taken into consideration, the process of the external heap memory releasing routine 19 illustrated in FIG. 3 is the process of the external heap memory releasing section 17.

A check is made whether another object in the memory area not to be released refers to an object in the external heap memory "i" to be released (step 190). If yes (step 192), the target object is moved to the memory area not to be released (if there is plural memory areas not to be released, it is desirable to select a memory area not to be released in which an object referring to the target object is stored) and the reference of another object is corrected to the destination where the target object is moved (step 194). The process returns to the step 190, and the step 194 is repeated until other objects in the memory area not to be released do not refer any longer to any object in the external heap memory "i" to be released. If another object in the memory area not to be released does not refer to an object in the external heap memory "i" to be released (step 192), the external heap memory "i" to be released is released.

Figure 4A:
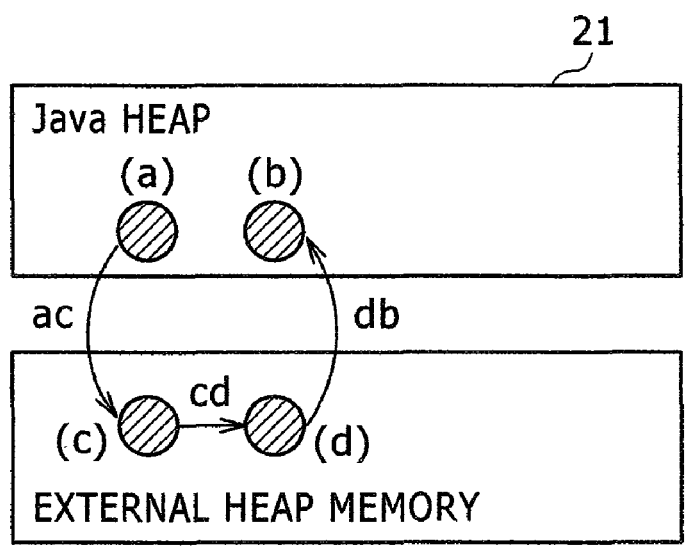
FIGS. 4A to 4C are diagrams illustrating examples of an external heap memory release process.
Figure 4B:
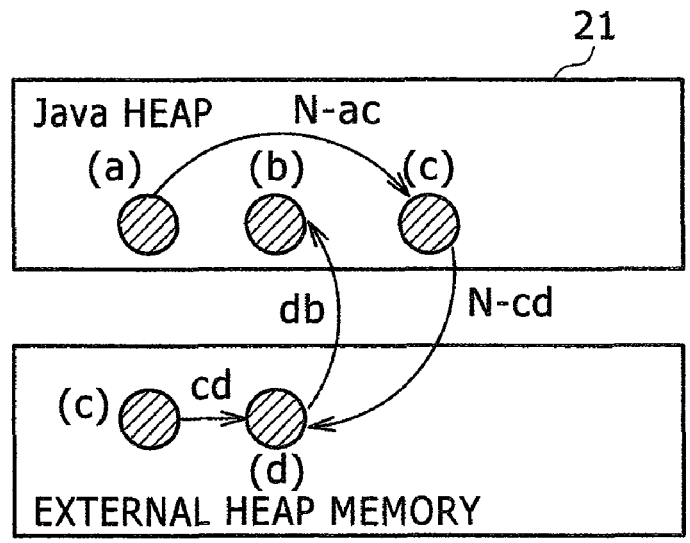
Figure 4C:
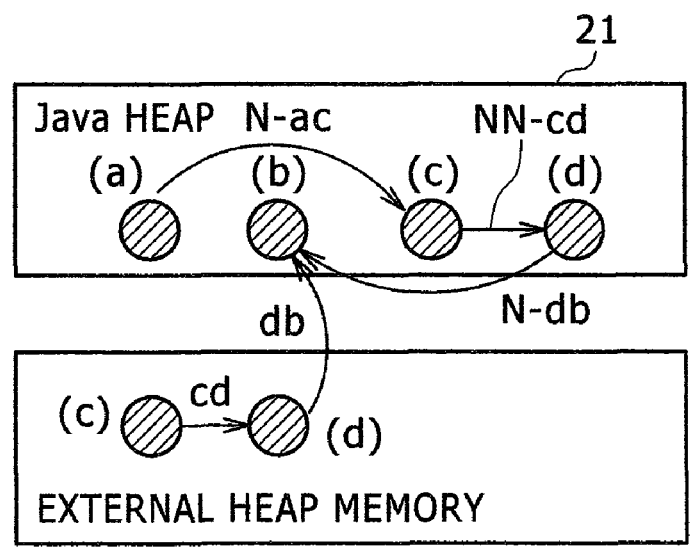

The above release process is described using an example illustrated in FIGS. 4A to 4C. FIGS. 4A to 4C are examples illustrating the release of an external heap memory in FIG. 4A with the memory area to be released taken as an external heap memory and the memory area not to be released taken as the Java heap 21. Objects (a) and (b) exist in the Java heap 21 being the memory area not to be released. Objects (c) and (d) exist in the external heap memory being the memory area to be released. There are a reference ac of the object (a) to the object (c), a reference cd of the object (c) to the object (d) and a reference db of the object (d) to the object (b). In the figure, a reference jk is indicated by an arrow from an object "j" (to be referred to) to an object "k" (to which the object "j" refers).

If the step 190 in FIG. 3 is executed, there is the reference ac of the object (a) in the memory area not to be released (the Java heap 21) to the object (c) in the memory area to be released (the external heap memory) (step 192), so that the step 194 is executed. At this point, the object (c) is the target object. If the step 194 is executed, the object (c) being the target object is moved to the memory area not to be released (the Java heap 21) and the reference ac of the object (a) to the object (c) is corrected to a reference N-ac to the moved object (c). The move of the object (c) to the memory area not to be released (the Java heap 21) newly creates a reference N-cd of the moved object (c) to the object (d). FIG. 4B illustrates the arrangement of the objects and the references therebetween as the result of the above process.

In the state shown in FIG. 4B, if the step 190 is executed again, there is the reference N-cd of the object (c) in the memory area not to be released (the Java heap 21) to the object (d) in the memory area to be released (the external heap memory) (step 192), so that the step 194 is executed. At this point, the object (d) is the target object. If the step 194 is executed, the object (d) being the target object is moved to the memory area not to be released (the Java heap 21) and the reference N-cd of the object (c) to the object (d) is corrected to a reference NN-cd to the moved object (d). The move of the object (d) to the memory area not to be released (the Java heap 21) newly creates a reference N-db of the moved object (d) to the object (b). FIG. 4C illustrates the arrangement of the objects and the references therebetween as the result of the above process.

In the state shown in FIG. 4C, if the step 190 is executed again, there does not exist an object in the memory area not to be released (the Java heap 21) which refers to an object in the memory area to be released (the external heap memory), that is to say, there is no reference to the object of the memory area to be released (the external heap memory), so that the external heap memory being the memory area to be released is released (step 196). As is clear from the above description, since there is no reference to the object on the external heap memory, the release of the external heap memory as the memory area does not cause a problem with the execution of the program.

Since the object (d) that refers to the object (b) is in the external heap memory being the memory area to be released and the object (d) does not refer to the object (b) after the external heap memory is released, the existence of the reference db of the object (d) to the object (b) does not influence the subsequent execution of the Java program.

As described with reference to FIGS. 3 to 4C, the larger the number of objects existing in the memory area to be released and the memory area not to be released, the longer the time required for processing related to checking if another object existing in the memory area not to be released refers to the target object existing in the memory area to be released, moving the target object if such a reference exists and correcting the reference to the moved target object. In other words, the larger the memory capacity of a system, the longer the time required for releasing the memory safely (without affecting the execution of a program).

Such a problem is solved in the following manner. In FIG. 4, one external heap memory is taken as the memory area to be released. In addition, the memory area not to be released is taken as the Java heap 21. Actually, if one external heap memory (for example, the external heap memory 1(31) in FIG. 1) is taken as the memory area to be released, the memory area not to be released includes not only the Java heap 21 but also external heap memories not to be released (for example, the external heap memory 2(32), the external heap memory 3(33) . . . in FIG. 1) as illustrated in FIG. 1. Therefore, control is performed so that some external heap memories are collectively released. Collectively releasing some external heap memories probably makes smaller the number of objects in relation to a check on the reference of the object in the memory area not to be released to the object in the memory area to be released, the move of the object and the correction of the reference than separately releasing external heap memories. This is because collected some external heap memories are taken as the memory area to be released to probably turn the reference of an object in the memory area not to be released to an object in the memory area to be released into the reference between objects in the memory area to be released. In other words, increasing the capacity of the memory area to be released brings about the same effect. However, increasing the capacity of each external heap memory leads to developing the Java program including functions for using them, which may lower the efficiency of development of the Java program. In the following, there is described in detail the collective release of external heap memories.

The program executing section 12 executing the statement (201 in FIG. 2) for generating the external heap memory "i" in the Java program 20 generates the external heap memory "i" in the external heap memory generating section 15. In the data generation interval (202 in FIG. 2) described in the Java program 20 and in which data is generated in the external heap memory "i," the data generating section 16 generates data (object) in the external heap memory "i." If the Java program 20 explicitly instructs the release of the external heap memory "i" (203 in FIG. 2), the external heap memory release reservation section 18 renders the designated external heap memory "i" into a release reservation state and registers a value that can uniquely identify the designated external heap memory "i" (hereinafter referred to as external heap memory ID) in an external heap memory release reservation management table 22. The term "release reservation state" refers to a state in which the external heap memory may be released.

The Java virtual machine 10 is an object (to which the object in the memory area not to be released refers) required for executing the Java program 20 at a certain moment (described in detail later) and the external heap memory releasing section 17 moves the target object in the external heap memory "i" in the release reservation state in the external heap memory release reservation management table 22 to the memory area not to be released, releasing the external heap memory "i" reserved to be released.

Figures 5, 6:
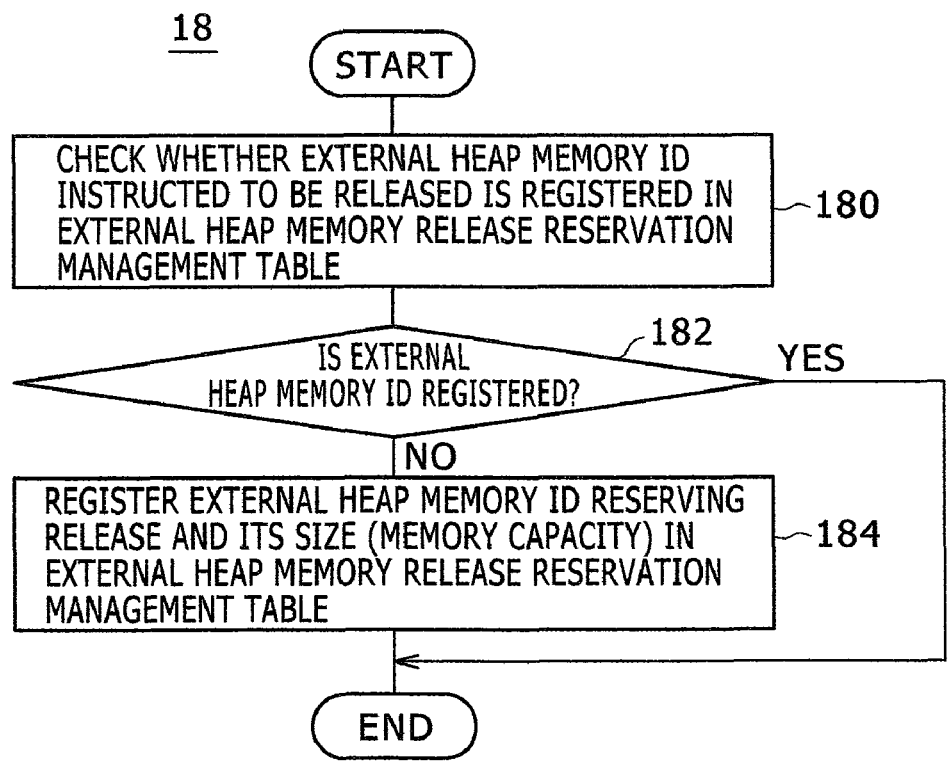
FIG. 5 is a table illustrating an example of an external heap memory release reservation management table.
FIG. 6 is a process flow chart of an external heap memory release reservation section.

FIG. 5 is a table illustrating an example of the external heap memory release reservation management table 22. In this example, an external heap memory ID and its heap size (memory capacity) are associated with each line and registered. FIG. 5 shows that the external heap memory IDs EH1, EH2, EH3 . . . EHm and their respective heap sizes Eh1 (Kbytes), Eh2 (Kbytes), Eh3 (Kbytes) . . . Ehm (Kbytes) associated with FIG. 1 are registered. The external heap memory ID may uniquely identify each external heap memory "i" and the heap size may be registered as required.

FIG. 6 is a process flow chart of the external heap memory release reservation section 18 executing process in response to the release instruction 203 of the external heap memory. A check is made whether the external heap memory ID in the external heap memory instructed to be released is registered in the external heap memory release reservation management table 22 (step 180). If Yes, the process is ended. If No (step 182), the external heap memory ID reserving release and its heap size are registered in the external heap memory release reservation management table 22 (step 184). The term "registered" refers to a state occurring because the same external heap memory may be instructed to be released at plural places in a complicated program.

Figure 7:
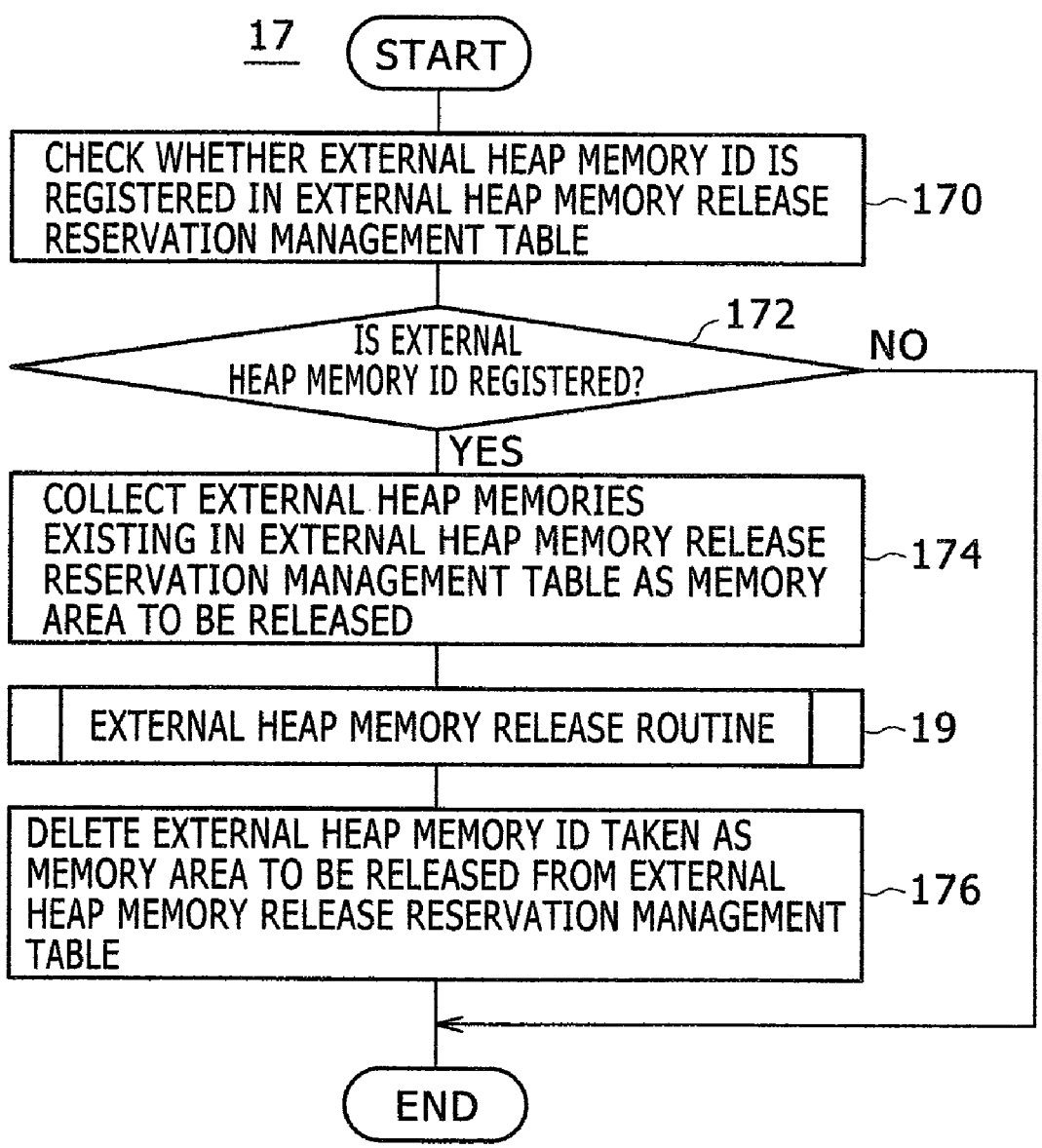
FIG. 7 is a process flow chart of an external heap memory releasing section.

FIG. 7 is a process flow chart of the external heap memory releasing section 17 for releasing the external heap memory reserved to be released. A check is made whether the external heap memory ID is registered in the external heap memory release reservation management table 22 (step 170). If the external heap memory ID is not registered in the external heap memory release reservation management table 22, the process is ended (step 172). If the external heap memory ID is registered in the external heap memory release reservation management table 22 (step 172), external heap memories corresponding the external heap memory ID and existing in the external heap memory release reservation management table 22 are collected as the memory area to be released (step 174) and the external heap memory releasing routine 19 is executed. The external heap memory releasing routine 19 described using FIG. 3 executes process with the collected external heap memories as the memory area to be released. The external heap memory ID which exists in the external heap memory release reservation management table 22 and is released by executing the external heap memory releasing routine 19 is deleted (step 176).

Figure 8A:
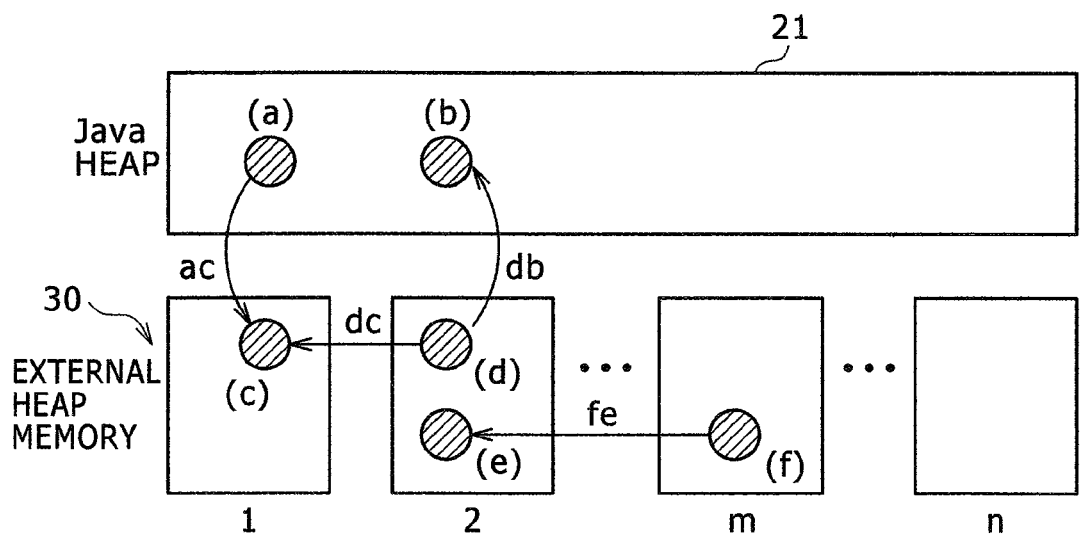
FIGS. 8A and 8B are diagrams exemplifying states of objects and references between the objects.

FIGS. 8A to 9B exemplify states of each object and references between the objects with respect to the release of the memory area to be released by a difference between the number of external heap memories collected in step 174 in FIG. 7. FIG. 8A shows that objects (a) and (b) exist in the Java heap 21, an object (c) exists in the external heap memory 1 in the external heap memory 30, objects (d) and (e) exist in the external heap memory 2, an object (f) exists in the external heap memory "m", a reference ac of the object (a) to the object (c), references db and dc of the object (d) to the objects (b) and (c) and a reference fe of the object (f) to the object (e). There is described below a state in a case where the memory area to be released is released according to the external heap memory ID registered in the external heap memory release reservation management table 22 based on a state of each object and references between the objects illustrated in FIG. 8A (or, in a case where the execution of the external heap memory releasing routine 19 is completed in FIG. 7).

Figure 8B:
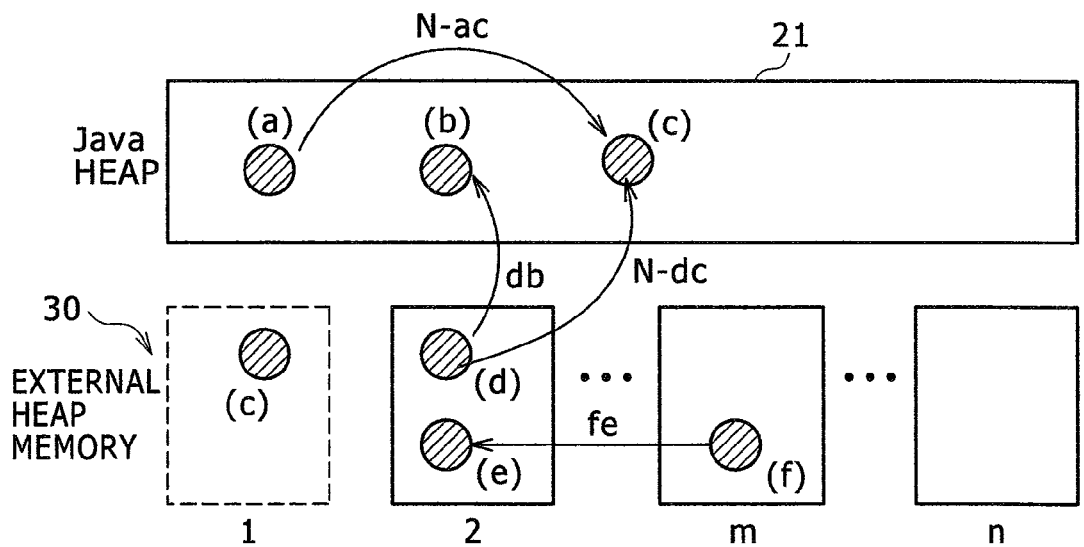

FIG. 8B shows that the external heap memory 1 is registered as the external heap memory ID in the external heap memory release reservation management table 22 and released as the memory area to be released. In the figure, the external heap memory 1 being the memory area to be released is indicated by the broken line. In the state in FIG. 8A, there exist the references ac and dc of the object (a) of the Java heap 21 being the memory area not to be released and the object (d) of the external heap memory 2 to the object (c) of the external heap memory being the memory area to be released respectively, the object (c) is moved as the target object to the Java heap 21 being the memory area not to be released to correct the references ac and dc to new references N-ac and N-dc.

Figure 9A:
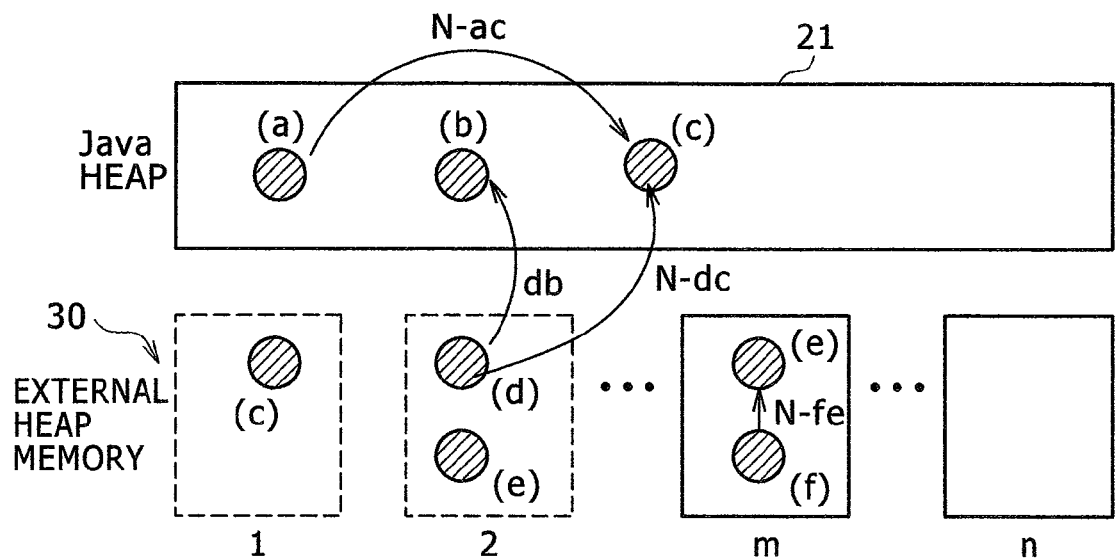
FIGS. 9A and 9B are diagrams exemplifying states of objects and references between the objects.

FIG. 9A shows that the external heap memories 1 and 2 are registered as external heap memory IDs in the external heap memory release reservation management table 22 based on the state in FIG. 8A, and the external heap memories 1 and 2 are collected and released as the memory area to be released. In the figure, the external heap memories 1 and 2 being the memory area to be released are indicated by the broken line. Since the external heap memories 1 and 2 are released based on the state in FIG. 8A, the objects (a) to (d) and the references between their objects are the same as those in FIG. 8B. Since there exists a reference fe of an object (f) in the external heap memory "m" being the memory area not to be released to an object (e) in the external heap memory 2 being the memory area to be released, the object (e) is moved as the target object to the external heap memory "m" being the memory area not to be released to correct the reference fe to a new reference N-fe.

Figure 9B:
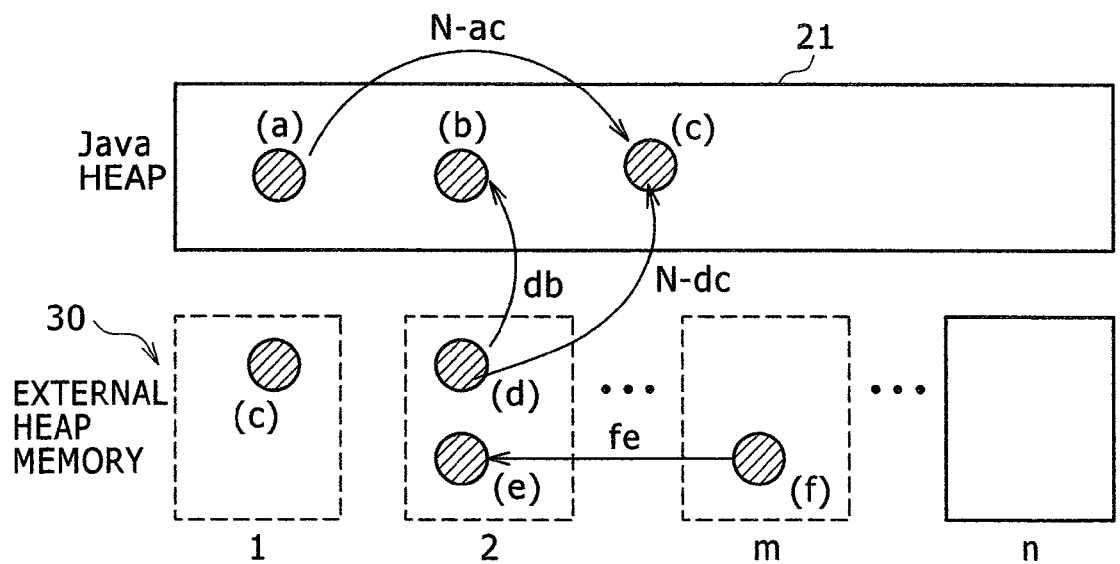

FIG. 9B shows that the external heap memories 1 to m are registered as the external heap memory IDs in the external heap memory release reservation management table 22 based on the state in FIG. 8A (for the sake of simplicity of description, 1 to m are taken as serial numbers but may be discontinuous), and the external heap memories 1 to m are collected and released as the memory area to be released. In the figure, the external heap memories 1 to m being the memory area to be released are indicated by the broken line. Since the external heap memories 1 to m are released based on the state in FIG. 8A, the objects (a) to (d) and the references between their objects are the same as those in FIG. 8B. For the reference fe of the object (f) to the object (e) described in FIG. 9A, since the external heap memory 2 where the object (e) exists and the external heap memory "m" where the object (f) exists are the memory areas to be released, the objects are not moved and the reference is not corrected.

As can be seen from difference (reference fe) between FIGS. 9A and 9B, collecting some external heap memories reduces the number of objects in relation to a check on the reference of the object in the memory area not to be released to the object in the memory area to be released, the move of the object and the correction of the reference. As the system becomes large in size, the number of the external heap memories and capacity thereof are increased and the number of objects and references are also increased, enhancing the effect of reducing process time at the time of releasing the external heap memories.

When this idea is further developed, collectively releasing the external heap memory 30 after the execution of the Java program is completed is to minimize the process time. This loses the advantage that the memory area is dynamically secured while the Java program is executed and dynamically released to be reused after the use of the memory area is completed and the use efficiency of the memory area is increased to resultantly eliminate the need for increasing the capacity of the memory implemented in the computer 100. In addition, the computer is continuously operated, so that timing of releasing the external heap memory 30 cannot be determined depending on applications. Therefore, it is necessary to balance the trade-off between the memory capacity of the external heap memory and the process time required for releasing the external heap memory. The trade-off depends on the number of objects and references, which depends on an application executing the Java program 20.

There is described "certain moment" which means the timing of releasing the external heap memory 30 and is required for balancing the trade-off between the memory capacity of the external heap memory and the process time required for releasing the external heap memory. In other words, the term "certain moment" refers to execution timing of the external heap memory releasing section 17. As described below, some methods of determining execution timing are selected based on applications.

(1) "Certain moment" is taken as the time of occurrence of GC. When the amount of use of the Java heap 21 exceeds a certain threshold, the Java virtual machine 10 operates the garbage collector 13 to execute GC on the Java heap 21. The occurrence of GC is used as a target for timing of releasing the external heap memory 30. For this reason, when the amount of use of the Java heap 21 exceeds a certain threshold, the Java virtual machine 10 performs control so as to execute the external heap memory releasing section 17 (FIG. 7) and then execute the garbage collector 13. The check on the reference of the memory area not to be released to the memory area to be released in the step 190 of the external heap memory releasing routine 19 (FIG. 3) at the time of executing the external heap memory releasing section 17 is the same as the process following the reference of the objects in GC, so that the process of a part (check on reference) of the garbage collector 13 can be compensated with an external heap memory releasing process. This enables reduction of the sum of stoppage time for GC and stoppage time for external heap memory release (related to the execution of the external heap memory releasing routine 19).

Figure 10A:
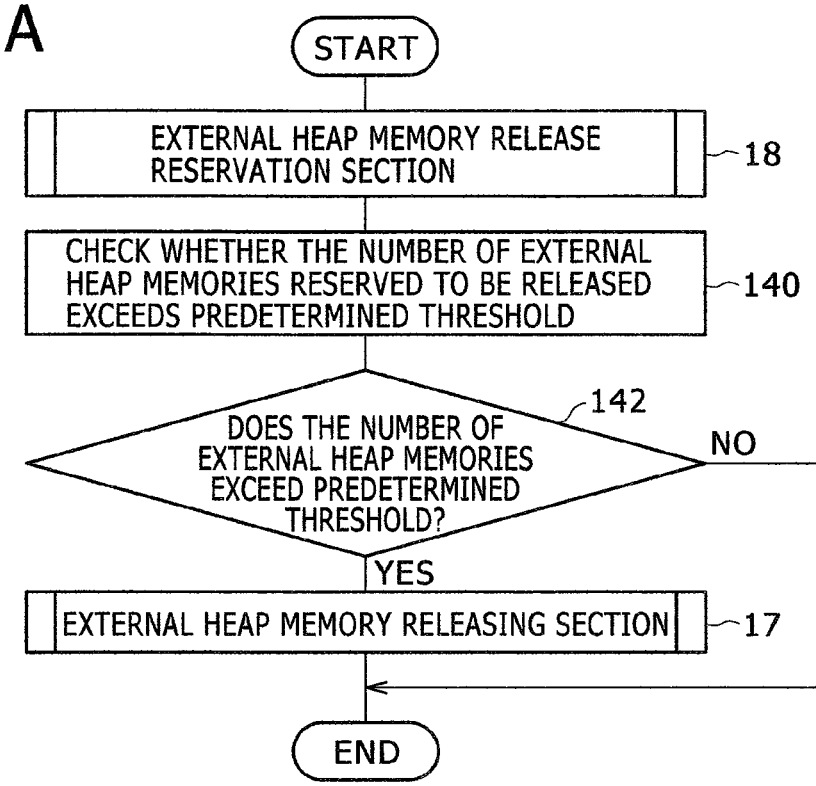
FIGS. 10A and 10B are process flow charts illustrating an example of an external heap memory release timing determination routine.

(2) "Certain moment" is taken as the time of the number of external heap memory release reservations exceeding a certain threshold. With reference to FIG. 6, there has been shown that the external heap memory release reservation section 18 starts execution in response to the release instruction 203 of the external heap memory. An external heap memory release timing determination routine is provided on the Java virtual machine 10 (not shown in FIG. 1) as a process for controlling the start of executing the external heap memory release reservation section 18. FIG. 10A is a process flow chart illustrating an example of the external heap memory release timing determination routine. As is the case with FIG. 6, the external heap memory release reservation section 18 is first executed in response to the release instruction 203 of the external heap memory. A check is made whether the number of external heap memories reserved to be released which are registered in the external heap memory release reservation management table 22 exceeds a predetermined threshold along with the execution of the external heap memory release reservation section 18 (step 140). If yes (step 142), the external heap memory releasing section 17 is executed. The predetermined threshold is determined based on applications or a rule of thumb in design. Incidentally, if the external heap memory ID is registered in the external heap memory release reservation management table 22 in step 182 of the external heap memory release reservation section 18, the step 140 and the subsequent steps are not needed, but are optional design items which may be executed.

The use efficiency of the external heap memory 30 depends on the predetermined threshold determined based on applications or a rule of thumb in design, which is one method of balancing the trade-off between the use efficiency of the external heap memory 30 and the process time required for releasing the external heap memory.

Figure 10B:
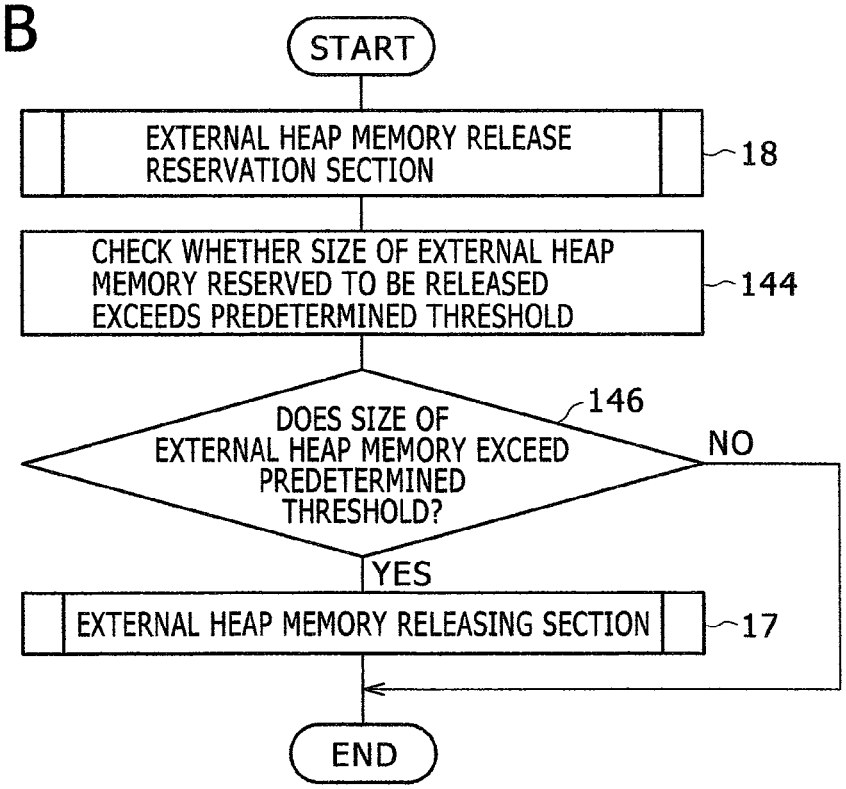

(3) "Certain moment" is taken as the time when the total heap size (memory capacity) of the external heap memories reserved to be released exceeds a certain threshold. FIG. 10B is another example of the external heap memory release timing determination routine. The example in FIG. 10B is different from the example in FIG. 10A in that a determination is made whether the total of the external heap memory size (memory capacity) reserved to be released which is registered in the external heap memory release reservation management table 22 exceeds a predetermined threshold in steps 144 and 146.

It is enabled to balance the trade-off between the use efficiency of the external heap memory 30 and the process time required for releasing the external heap memory even with a total heap size (memory capacity) as reference.

Although there are described above the three methods (1) to (3) of determining the predetermined timing (certain moment) in which the external heap memory is released, the external heap memory releasing section 17 may be periodically executed using a periodic timer, or, if the Java program 20 is a program for processing transaction, the external heap memory releasing section 17 may be executed depending on the number of the processed transactions or the number of times that data is committed to the database required for transaction process. Alternatively, a combination of these determination methods may be used.

According to the present embodiment, one or more external heap memories reserved to be released are collectively released at the predetermined timing, so that the process time required for releasing the external heap memory can be reduced while the use efficiency of the memory allocated to the external heap memory is being maintained.

Second Embodiment

FIG. 11 is a block diagram illustrating a configuration of a computer 101 according to the present embodiment. The configuration of the computer 101 is the same as that of the computer 100 except for an external heap memory generating section 45, an external heap memory releasing section 47 and an external heap memory release reservation section 48 included in the Java virtual machine (Java VM) 10 and an external heap memory release reservation management table 23 and an external heap memory generating management table 24 on the Java heap 21. Incidentally, the external heap memory generating management table 24 may be provided on the external heap memory 30. The second embodiment is different from the first embodiment in that external heap memories are grouped and managed. The difference is described below.

FIG. 12 is a table illustrating an example of the external heap memory release reservation management table 23. In this example, an external heap memory ID and group ID of the group to which external heap memory ID belongs are associated with each line and registered. FIG. 12 shows that, for example, an external heap memory in which the external heap memory ID is EH1 belongs to a group in which the group ID is G1.

The group ID of the group to which each external heap memory belongs is determined as a design item and written in the external heap memory generating statement of the Java program 20. For example, a group ID is provided by plural sub-programs forming an application program.

FIG. 13 is a table illustrating an example of the external heap memory generating management table 24. The external heap memory generating management table 24 associates the group ID with the number of the external heap memories grouped and generated by the group ID (referred to as the number of generation) and stores them therein. As illustrated in the figure, the figure shows that twelve external heap memories in which the group ID is grouped to G-1 are generated.

Figure 14:
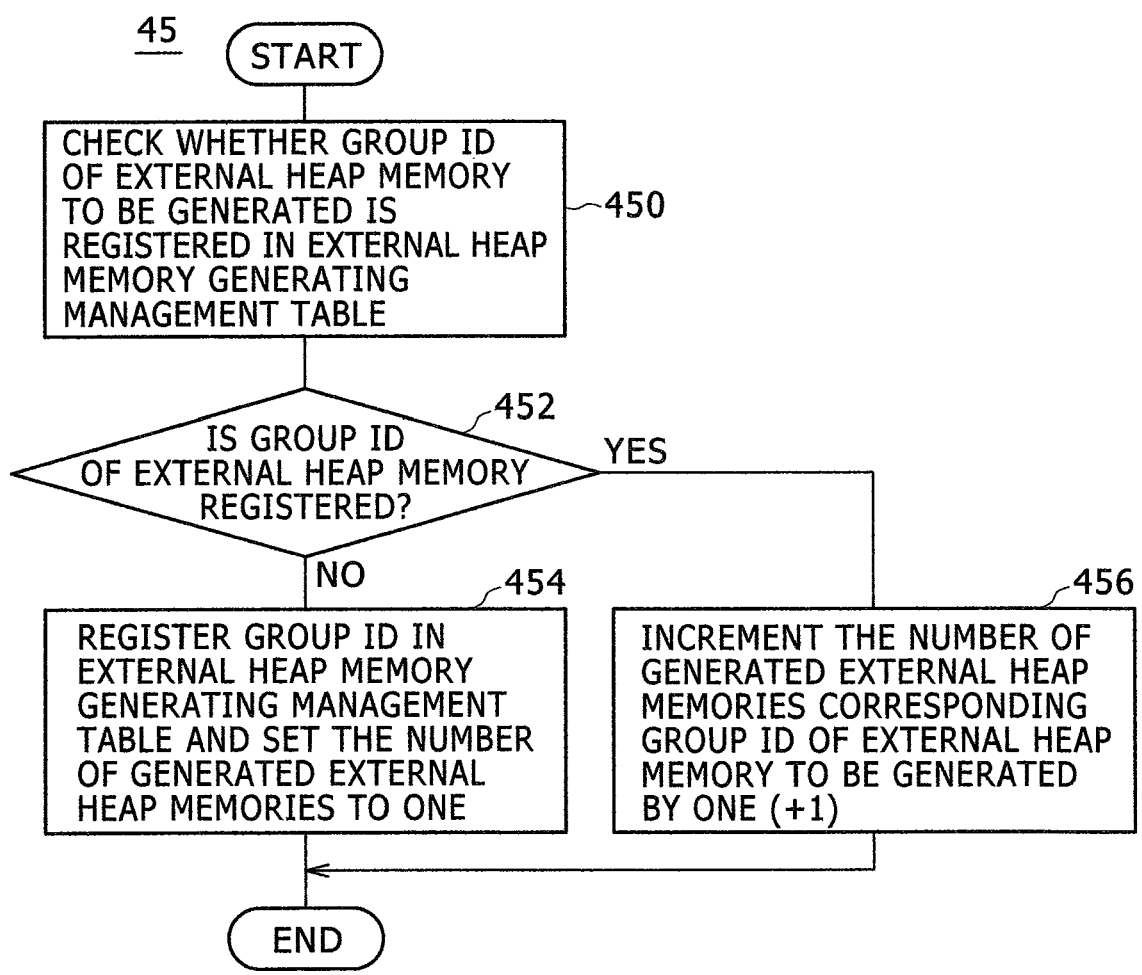
FIG. 14 is a process flow chart of an external heap memory generating section.

FIG. 14 is a process flow chart of the external heap memory generating section 45. A check is made whether the group ID of the external heap memory to be generated is registered in the external heap memory generating management table 24 (step 450). If not (step 452), the group ID of the external heap memory to be generated is registered in the external heap memory generating management table 24, the number of generation corresponding the group ID is taken as one (step 454). If the group ID is registered therein (step 452), the number of generation corresponding the group ID of the external heap memory to be generated is incremented by one (+1) (step 456).

FIG. 15 is a process flow chart illustrating an example of the external heap memory release timing determination routine executed by the Java virtual machine 10. In the figure, steps 500 to 504 are processes of the external heap memory release reservation section 48 and steps 510 to 514 are processes of the external heap memory releasing section 47.

A check is made whether the external heap memory ID of the external heap memory instructed to be released is registered in the external heap memory release reservation management table 23 in response to instructions for the release of the external heap memory (step 500). If yes (step 502), the process is ended. If no (step 502), the external heap memory ID reserving release and its group ID are registered in the external heap memory release reservation management table 23 (step 504).

There are checked the number of the registered group IDs registered in the external heap memory release reservation management table 23 (the number of release reservation external heap memories) and the number of the generated external heap memories corresponding to the group IDs in the external heap memory generating management table 24 (step 506). If the number of release reservation external heap memories is less than the number of the generated external heap memories (step 508), the process is ended. If the number of release reservation external heap memories is not less than the number of the generated external heap memories (step 508), which means that all external heap memories belonging to the group and generated are reserved to be released, the external heap memories having the group IDs and registered in the external heap memory release reservation management table 23 are collected as the memory area to be released (step 510). The external heap memory releasing routine 19 is executed to release the memory area to be released in which the external heap memories are collected. The external heap memory ID taken as the memory area to be released is deleted from the external heap memory release reservation management table 23 (step 512), and the group ID taken as the memory area to be released is deleted from the external heap memory generating management table 24 (step 514).

According to the present embodiment, since one or more grouped external heap memories are collectively released at the timing in which all of the generated external heap memories are regarded as being reserved to be released, the process time required for releasing the external heap memory can be reduced while the use efficiency of the memory allocated to the external heap memory is maintained.

Incidentally, the first embodiment is applicable to a group with an external heap memory in the present embodiment. Conversely, the first embodiment is implemented in a case where the number of groups in the external heap memory is one in the present embodiment. Consequently, the release timing described in the first embodiment as well as the release timing in the present embodiment can be used as the release timing of the external heap memory of a group in the present embodiment. It is advantageous in program design to apply the above double timings to a case where the number of external heap memories in a group and memory capacity are obliged to be increased.

According to the embodiments described above, it is possible to shorten the process time required for releasing dynamically secured memory area (external heap memory).

What is claimed is:

1. A memory management method, comprising the steps of:
    securing a memory area by a program executed by a computer;
    storing an object in the memory area in accordance with the execution of the program;
    bringing the memory area into a release reservation state in accordance with the program instructing the memory area to be released;
    moving the object to a memory area not to be released while another object in the memory area not to be released and not to be brought into the release reservation state refers to or is referred to from the object in the memory area to be released including the memory area to be brought into the release reservation state; and
    releasing the memory area to be released,
    wherein the moving the object to the memory area not to be released and the release of the memory area to be released are executed at a predetermined moment,
    wherein the predetermined moment is a moment when the memory area and other memory areas are grouped together and the memory area and the other memory areas are brought into the release reservation state.

2. The memory management method according to claim 1, wherein the predetermined moment is at least one of a moment when a number of the memory areas including the memory areas grouped together in the memory area to be released and to be brought into the release reservation state exceeds a predetermined value and a moment when a size of the memory areas grouped together to be released and to be brought into the release reservation state exceeds a predetermined size.

3. A computer comprising a memory and a processor executing a program for securing a memory area in the memory, storing an object in the secured memory area and bringing the memory area into a release reservation state and a memory processing section for moving the object to the memory area not to be released while another object in the memory area not to be released and not to be brought into the release reservation state on the memory refers to or is referred to from the object in the memory area to be released including the memory area to be brought into the release reservation state and releasing the memory area to be released, wherein the memory processing section executes the move of the object to the memory area not to be released and the release of the memory area to be released at a predetermined moment, wherein the predetermined moment is a moment when the memory area and other memory areas are grouped together and the memory area and the other memory areas are brought into the release reservation state.

4. The computer according to claim 3, wherein the predetermined moment is at least one of a moment when the number of the memory areas including the memory area in the memory areas grouped together to be released and to be brought into the release reservation state exceeds a predetermined value and a moment when a size of the memory areas grouped together to be released and to be brought into the release reservation state exceeds a predetermined size.

5. A non-transitory readable storage medium storing a program for executing a memory management method by using a computer, the method comprising the steps of:

securing a memory area by a program executed by a computer;

storing an object in the memory area in accordance with the execution of the program;

bringing the memory area into a release reservation state in accordance with the program instructing the memory area to be released;

moving the object to a memory area not to be released while another object in the memory area not to be released and not to be brought into the release reservation state refers to or is referred to from the object in the memory area to be released including the memory area to be brought into the release reservation state; and releasing the memory area to be released, wherein the moving the object to the memory area not to be released and the release of the memory area to be released are executed at a predetermined moment, wherein the predetermined moment is a moment when the memory area and other memory areas are grouped together and the memory area and the other memory areas are brought into the release reservation state.

6. The non-transitory computer readable storage medium according to claim 5, wherein the predetermined moment is at least one of a moment when the number of the memory areas including the memory areas grouped together in the memory area to be released and to be brought into the release reservation state exceeds a predetermined value and a moment when a size of the memory areas grouped together to be released and to be brought into the release reservation state exceeds a predetermined size.

* * * * *